July 29, 1952
J. R. MOORE
2,605,464
SYNCHRONIZED PULSE-ECHO DETECTION SYSTEM
Filed Nov. 28, 1942
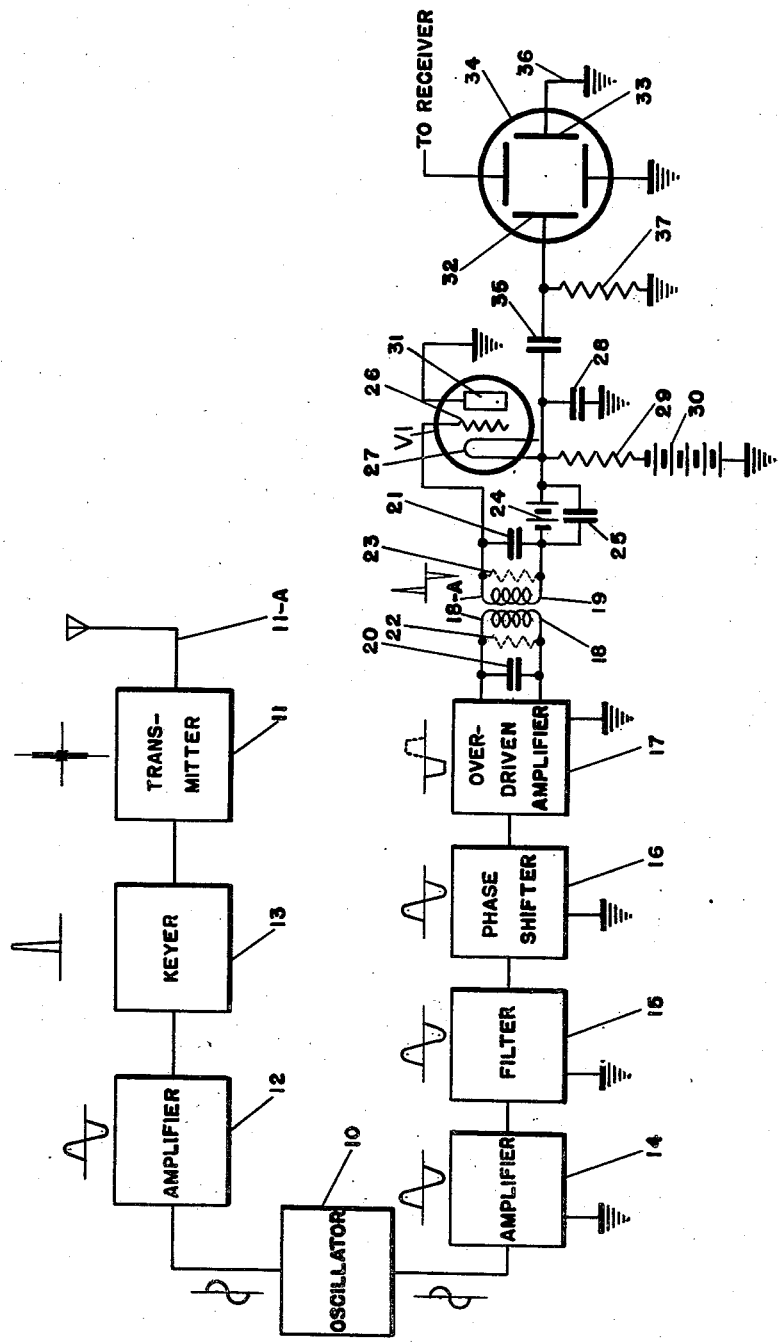
INVENTOR
JAMES R. MOORE
BY
ATTORNEY Patented July 29, 1952

2,605,464

UNITED STATES PATENT OFFICE 2,605,464

SYNCHRONIZED PULSE-ECHO DETECTION SYSTEM

James R. Moore, Rumson, N. J., assignor to the United States of America as represented by the Secretary of War Application November 28, 1942, Serial No. 467,263

3 Claims. (Cl. 343—13)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a radio system for detecting and locating distant objects capable of reflecting radio waves.

Radio systems of this type ordinarily have a radio transmitter which transmits periodically very powerful, short radio-frequency impulses by means of a highly directional transmitter antenna. A portion of the transmitted signal is reflected or reradiated by an object, such as an airplane, back to the transmitter which is normally inoperative at this instant. The reflected signal is received by a local receiver and utilized for determing the position of the object with respect to that of the transmitter-receiver combination.

The position of the object is ordinarily determined by observing the relative position of the transmitted and reflected signals on the screen of a cathode-ray oscilloscope operated in strict synchronism with the transmitted signals, and it is this rigid constantly maintained synchronism between the transmitter and the sweep circuit of the oscilloscope that determines to a very large extent the precision and accuracy of the systems of this kind.

Some of the peculiar requirements imposed upon the oscilloscope sweep circuit, if it is to function satisfactorily in connection with the systems of this type, are that it must be in constant synchronism with the transmitted signals, and, at the same time, it must be completely protected from an extremely powerful radio-frequency interference effect produced by the transmitted signals. This radio frequency interference is capable of completely obliterating proper synchronism between the transmitter and the oscilloscopes in the receiver by prematurely tripping the sweep circuits.

It is, therefore, an object of this invention to provide a novel method of maintaining synchronism between the transmitted signals and the sweep circuit channels of the oscilloscopes connected to the receiver.

Another object of this invention is to provide a sweep circuit channel which will be unaffected by the transmitted signals.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing.

The single figure illustrates an embodiment of my invention in the form of a block diagram of the transmitter channel, and that part of the receiver channel which provides a sweep voltage for the oscilloscope. The sweep circuit itself is shown in the form of a schematic diagram.

Referring to the drawing, master oscillator 10 is used to key radio transmitter 11 at a frequency of the master oscillator. The elements in the transmitter channel are amplifier 12, keyer 13, and transmitter 11.

Oscillator 10 is also connected to the sweep circuit channel of the receiver, this circuit comprising, in the main, amplifier 14, filter 15, phase-shifter 16, one or several overdriven amplifiers 17, air core transformer 18–A, saw-tooth oscillator VI, and cathode ray oscilloscope tube 34. Amplifier 14 amplifies the impressed sinusoidal wave, and filter 15 is a band-pass filter which eliminates the harmonic frequencies that may be present in the amplified fundamental wave. Phase shifter 16 is used to vary the lateral position of the transmitter and reflected signals on the screen of oscilloscope 34, the degree of this shift determining the distance to the echo-producing object. Overdriven amplifier 17 may have one or several stages of amplification, the desired wave-form in the output circuit of this amplifier, as well as the intensity of the grid signal for tube VI being the determining factors.

The output of amplifier 17 is connected to air-core transformer 18–A whose primary 18 and secondary 19 are shunted by condensers 20 and 21. These condensers act as short circuiting paths for the radio-frequency interference signals induced in this channel by the transmitted signals. Condensers 20 and 21 may or may not be shunted by resistances 22 and 23 as an additional means of avoiding local oscillations, if the resistive components of the impedances of the air transformer coils are too low.

Secondary 19 is connected at one end to grid 26 of triode VI and at the other end to C— bias battery 24, the later in turn being connected to cathode 27 of tube VI. Battery 24 is shunted by a radio-frequency by-pass condenser 25. Battery 24 normally biases tube VI beyond cut-off point so that only the upper part of the positive wave shown above secondary 19 can render tube VI conductive. Tube VI may be either a gas-filled or a vacuum tube. It may be a triode or a multi-grid tube. The choice of the type of tube depends, in part, upon the keying frequency of the transmitter. At high keying frequencies the deionization period of a gas-filled tube may prevent the use of the gas-filled tube in the circuit.

High load resistance 29 and battery 30 are connected between filament 27 and plate 31 of tube VI, the latter element being grounded. Condenser 28, connected across battery 30 and resistance 29, has a relatively slow charging rate through resistance 29. The accumulated charge on this condenser is discharged very quickly through tube VI when this tube is rendered conductive. The periods of charge and discharge of condenser 28 is under complete control of the positive signal peaks shown above secondary 19. This periodic charging and discharging of condenser 28 produces a voltage signal across condenser 28 of a well known sawtooth wave form. Deflection plates 32—33 of cathode ray tube 34 are connected across condenser 28 by condenser 35 on one side, and grounded conductor 36 on the other side. Resistance 37 is a high leakage resistance.

It is to be noted that condenser 28 is directly connected to ground so that it will offer low impedance path to ground for any radio frequency interference in this circuit. Condenser 35, on the other hand, will offer a very high impedance to ground for the same frequency since it is grounded through high resistance 37 having an impedance in the order of several megohms.

The operation of my system is as follows:

Master oscillator 10 impresses a sinusoidal wave on amplifier 12, the output of which is connected to keyer 13. Keyer 13 reshapes this sinusoidal wave into a series of sharp periodic positive pulses which occur once for each complete period of the sinusoidal wave generated by oscillator 10. The duration of each positive pulse represents only a very small fraction of the time necessary for oscillator 10 to deliver one complete cycle. These sharp pulses are used to key transmitter 11, whose tubes deliver radio-frequency pulses to antenna 11-A. The duration of this pulse is equal to the duration of the keying pulse delivered by keyer 11. The approximate wave forms and duration of signals in this channel is graphically illustrated by the wave-forms shown above the elements producing them.

From the above description of the transmitter channel it follows that the sinusoidal wave generated by oscillator 10 is transformed into a transmitted pulse of radio-frequency of a much shorter duration than the period of the original sinusoidal wave, but whose phase as well as the duration are under constant and fixed control of this sinusoidal wave. It is this transmitted signal that is apt to cause untimely tripping of the oscilloscope sweep circuit in the oscilloscope channel even if the components of this oscilloscope circuit are carefully shielded.

The oscilloscope channel is also coupled to master oscillator 10, and the wave-forms produced by the component elements of this channel are indicated above the elements producing them. When the phase shifter is set at zero, input signal into the overdriven amplifier will be in phase with the original sinusoidal wave. Depending upon the number of stages used in the overdriven amplifier, the output voltage may be either of positive or of negative value. However, the connections between the output of this amplifier and primary 18 of the air core transformer should be such that a positive pulse is impressed on the grid of tube VI, to render tube VI conductive. This lowering of the internal impedance of tube VI terminates the charging period of condenser 28 by quickly discharging it through this tube. Since the charging and discharging periods of condenser 28 are utilized for producing a horizontal sweep circuit for oscilloscope 34, it follows that the beginning and the termination of travel of the oscilloscope beam from one extreme position to another, or the sweep, will be under constant timing control of oscillator 10, and accordingly, in synchronism with the transmitted signals.

The radio frequency interference is nullified in the sweep circuit by shunting primary 18 with condenser 20, by shunting secondary 19 with condenser 21, and by by-passing battery 24 with condenser 25. Therefore, any radio interference appearing in the input circuit of tube VI is conducted to ground over a low impedance path of condensers 21, 25 and 28, the latter being grounded.

It is significant to note that plate 31 of tube VI, condenser 28, as well as the positive pole of battery 30 are all directly connected to ground, and that the load resistance 29 is connected in the cathode circuit rather than in the plate circuit. With this disposition of elements, the radio frequency interference is completely nullified since it becomes possible to assign a dual function to condenser 28.

One purpose is to offer a low impedance path to ground for all radio frequency interference, and another to act as an accumulator of charge in the saw-tooth oscillator circuit.

The advantages of my sweep circuit are apparent from the above description. Peaked pulses of short duration but of high voltage produced by the air-core transformer have complete control over the saw-tooth oscillator, and keep it in synchronism with the transmitted signals with a high degree of accuracy. At the same time, because of the novel connections used within the oscillator circuit itself, the radio-frequency interference is incapable of disrupting the necessary synchronism between the transmitted signals and the sweep circuit.

Although I have illustrated a preferred form for carrying out my present invention, it is to be understood that modifications are feasible, and that I do not intend to be limited except as set forth in the following claims.

I claim:

1. A pulse-echo object detection system comprising means for transmitting spaced pulses of radio frequency energy, means including a cathode ray oscilloscope for indicating said transmitted pulses and echoes thereof, a saw-tooth, electron discharge tube oscillator for generating a deflecting voltage for said oscilloscope, a synchronizing oscillator for controlling the transmission of said pulses and the repetition rate of said saw-tooth oscillator, said saw-tooth oscillator including a charging condenser connected between an output element of said tube and ground, said condenser serving to develop saw-tooth waves and, at the same time, shunt to ground any radio frequency potentials impressed on said saw-tooth oscillator.

2. A system as set forth in claim 1, wherein said tube is a grid-controlled discharge tube having a grounded plate, said condenser being connected between the cathode of said tube and ground, and further including means for impressing spaced pulse potentials derived from said synchronizing oscillator between the grid and cathode of said tube, a resistor having one end connected to said cathode, a source of potential having a positive grounded terminal and a negative terminal that is connected to the other end of said resistor, said resistor and condenser developing saw-tooth waves under the control of said spaced pulse potentials, and means to impress said saw-tooth waves upon the deflection plates of said oscilloscope.

3. A system as set forth in claim 2, further including means to bias said tube to normal cut-off until said spaced pulse potentials overcome said bias.

JAMES R. MOORE.

REFERENCES CITED

The following references are of record in the file of this patent:

UNITED STATES PATENTS

| Number | Name | Date |
|---|---|---|
| 1,933,219 | Nakajima, et al. | Oct. 31, 1933 |
| 2,114,938 | Puckle | Apr. 19, 1938 |
| 2,140,267 | Markowitz | Dec. 13, 1938 |
| 2,143,035 | Smith | Jan. 10, 1939 |
| 2,153,140 | Diehl, et al. | Apr. 4, 1939 |
| 2,208,422 | Hugon | July 16, 1940 |
| 2,225,046 | Hunter | Dec. 17, 1940 |
| 2,345,668 | Hallmark | Apr. 4, 1944 |
| 2,405,238 | Seeley | Aug. 6, 1946 |
| 2,407,294 | Shockley et al. | Sept. 10, 1946 |
| 2,423,024 | Hershberger | June 24, 1947 |